UNITED STATES PATENT OFFICE.

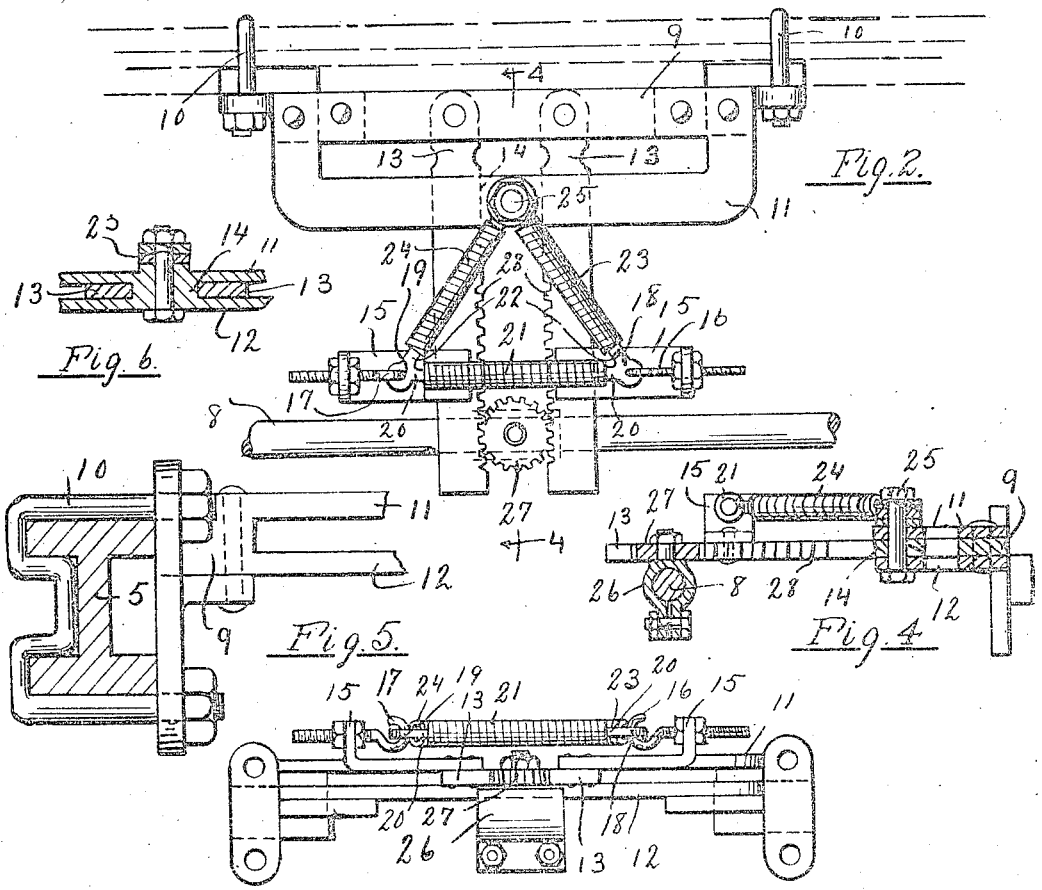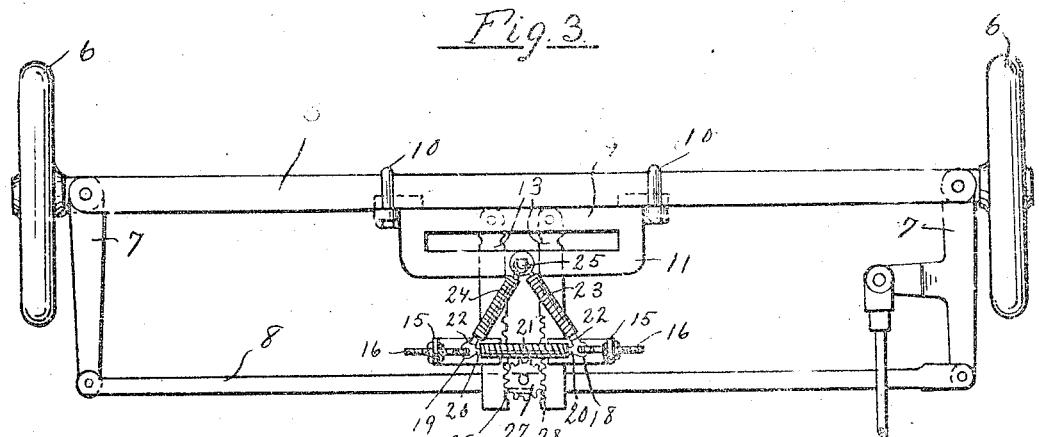

JOHN J. WOODRUFF AND JOSEPH KOSETKY, OF WASCO, CALIFORNIA.

AUTOMATIC STEERING MECHANISM.

1,151,145.  Specification of Letters Patent.  Patented Aug. 24, 1915.

Application filed October 31, 1914. Serial No. 869,515.

*To all whom it may concern:*

Be it known that we, JOHN J. WOODRUFF, a citizen of the United States, and JOSEPH KOSETKY, a citizen of Austria-Hungary, residing at Wasco, in the county of Kern and State of California, have invented new and useful Improvements in Automatic Steering Mechanism for wheeled vehicles, of which the following is a specification.

Our invention relates to new and useful improvements in attachments to the running gear of various kinds of vehicles for aiding in guiding the vehicle, reducing the jar, taking up motion and assisting the driver of the vehicle in guiding the same, and the object thereof is to provide mechanism of that character which will be cheap, simple in construction and operation and which can be attached or detached from the vehicle without altering the same.

We accomplish these objects by the mechanism described herein and illustrated in the accompanying drawings forming a part hereof in which:—

Figure 1 is a top plan of the front axle and wheels of an automobile with our invention in place thereon. Fig. 2 is an enlarged top plan of our device detached from the vehicle. Fig. 3 is a front elevation of Fig. 2. Fig. 4 is a section on the line 4—4 of Fig. 2. Fig. 5 is an enlarged detail of the attaching means of the device. Fig. 6 is an enlarged detail.

In the drawings 5 is the front axle, 6 the front wheels, 7 the steering knuckles and 8 the connecting rod by means of which the steering knuckles are caused to move in unison. In the center of the front axle is mounted a longitudinally extending slotted bearing member 9 by clips 10 or other means, and has extending outwardly from the ends thereof spaced guide member 11 and 12.

At each side of the center of member 9 are pivotally mounted the ends of adjusting rods 13 which rods extend rearwardly between guide members 11 and 12 and to a point just beyond connecting rod 8. A stop block 14 is mounted between guide bars 11 and 12 centrally thereof and serves to hold adjusting rods 13 to a movement in a direction away from each other when positioned for use.

Secured to the upper sides of adjusting rods 13 between the free ends thereof and guide bars 11 and 12 are L-shaped brackets 15 the shorter legs of which extend upwardly and have mounted therein spring holding hooks 16 and 17. Hooks 16 and 17 have loosely mounted thereon spring brackets 18 and 19 which brackets are substantially V-shaped and have secured to one of the legs 20 thereof one end of adjusting springs 21. Secured to the other legs 22 of brackets 18 and 19 are the outer ends of springs 23 and 24 the other ends of which are pivotally mounted upon a bolt 25 passing through guide members 11 and 12 and stop block 14 centrally thereof. Adjustably mounted upon connecting rod 8 centrally thereof is a bearing 26 upon the top of which is loosely mounted a spur gear 27 which gear is received between the opposed edges of adjusting bars 13 and the teeth thereof meet with teeth 28 of said bars.

In the operation of our device as the vehicle is guided in the usual manner the connecting rod will be moved to the right or left and gear 27 will move one or the other of adjusting rods 13 away from the other rod thereby stretching springs 21, 23 and 24 which springs will act to draw the rod to its normal position, and the wheels will be kept normally in planes at right angles to the front axle and in the event of the wheels coming in contact with any obstruction which would have a tendency to throw the wheels out of track, the device would cause the wheels to quickly return to their normal positions after being thrown to one side or the other. The device will also assist the driver in guiding the vehicle equipped with the invention and will take up any vibration or jar and in the event of any breakage of the steering gear the driver would have an opportunity to stop the machine before the same left the track.

Having described our invention what we claim is:—

1. In combination with a vehicle axle and a connecting rod for the steering wheels, a rectangular frame adapted to have one of its sides secured upon the front axle of the vehicle to extend therefrom toward the connecting rod, the sides of said frame having longitudinal slots extending therethrough to form a guideway; a pair of arms pivotally mounted at one end in the slot in the side of said frame secured to the axle and projecting through the slot in the other side to a point beyond the connecting rod; an L-shaped bracket secured upon the top of each of said arms and extending outwardly and upwardly therefrom; a hook adjustably mounted in the upwardly extending end of each of said brackets to extend toward each other; a V-shaped bracket pivotally mounted on each of said hooks; an elastic connection between one of the legs of each of said brackets; an elastic connection from the other leg of each of said brackets to the rear side of said frame; a stop block secured to the rear side of said frame within the slot and standing between the arms; and a member rotatably mounted upon the connecting rod between the free ends of said arms.

2. The combination with a vehicle axle and a connecting rod for the steering wheels, of a rectangular slotted frame adapted to have one of its sides secured upon the front axle of the vehicle to extend therefrom toward the connecting rod a pair of arms pivotally secured at one of their ends in the slot of said frame at the side secured to the front axle and extending therefrom to a point beyond the connecting rod; a bracket secured to the upper side of each of said arms near the free ends thereof and extending outwardly therefrom in opposite directions; a hook adjustably mounted in each of said brackets to extend toward each other; a pivot mounted in the free end of said frame to extend upwardly therefrom centrally thereof; a V-shaped bracket pivotally mounted on each of said hooks to extend toward each other, the outer leg of each bracket lying in a longitudinal plane passing centrally through said hooks; a coil spring connecting said outer legs; a spring connecting the other leg of each of said brackets with the pivot in the free end of said frame, said ends being free to swing on said pivot; a stop block secured to the free end of said frame within the slot and standing between the arms; and a member revolubly mounted upon the connecting rod between said arms.

In witness that we claim the foregoing we have hereunto subscribed our names this 19th day of October, 1914.

JOHN J. WOODRUFF.
JOSEPH KOSETKY.

Witnesses:
G. HARPHAM,
FRANK WATERFIELD.